United States Patent [19]
Scarpitti

[11] Patent Number: 5,952,732
[45] Date of Patent: Sep. 14, 1999

[54] VEHICLE SECURITY SYSTEM

[76] Inventor: Ernest A Scarpitti, 1012 Chalker St., Akron, Ohio 44310

[21] Appl. No.: 08/967,707

[22] Filed: Nov. 10, 1997

[51] Int. Cl.$^6$ ..................................................... B60R 25/04
[52] U.S. Cl. .................. 307/10.3; 307/10.6; 123/198 D; 123/198 DC; 180/287; 340/426
[58] Field of Search ..................................... 307/9.1–10.8; 123/198 B, 198 DB, 198 DC, 198 D; 180/287; 361/189, 191, 182, 170, 171; 340/425.5, 426, 428, 430, 438

[56] References Cited

U.S. PATENT DOCUMENTS

| | | | |
|---|---|---|---|
| 3,885,164 | 5/1975 | Vest | 307/10.2 |
| 4,063,610 | 12/1977 | Shilling | 307/10.2 |
| 4,071,007 | 1/1978 | Arix | 123/198 DC |
| 4,073,279 | 2/1978 | Fox . | |
| 4,733,638 | 3/1988 | Anderson | 180/287 |
| 5,079,436 | 1/1992 | Elkins . | |
| 5,144,300 | 9/1992 | Kanno . | |
| 5,209,196 | 5/1993 | Nickel et al. . | |
| 5,222,468 | 6/1993 | Korenaga | 180/287 |
| 5,360,997 | 11/1994 | Watson . | |
| 5,555,863 | 9/1996 | Kokubu | 307/10.3 |
| 5,557,255 | 9/1996 | Adams et al. | 180/287 |
| 5,630,997 | 5/1997 | Watson | 307/10.1 |
| 5,696,408 | 12/1997 | Man | 307/10.3 |
| 5,763,957 | 6/1998 | Kusunoki | 307/10.2 |

*Primary Examiner*—Albert W. Paladini
*Attorney, Agent, or Firm*—Michael I. Kroll

[57] ABSTRACT

A vehicle security system attached to a power source for controlling a vehicle ignition. The vehicle security system includes first and second normally closed switches connected in series along a first power line between the power supply and a distributor of the vehicle. The first switch is positioned within a cabin of the vehicle and the second switch is positioned with a trunk of the vehicle. A third normally open switch is connected along a second power line between the power supply and a trunk lock of the vehicle and positioned within the trunk of the vehicle. The first and second switches are operable between a first closed position connecting the power source to the distributor allowing the vehicle to be started and a second open position disconnecting the power source from the distributor and preventing the vehicle from starting. The third switch is operable between a first open position disconnecting the power source from the trunk lock and a second closed position connecting the power source to the trunk lock causing the trunk lock to turn and thus open the trunk.

1 Claim, 7 Drawing Sheets

S2 — INSTALL POWER LINE FROM POWER SOURCE THROUGH CAR CABIN INTO TRUNK AND BACK TO DISTRIBUTOR OF CAR TO COMPLETE CIRCUIT

S4 — INSTALL FIRST AND SECOND SWITCH ALONG POWER LINE WITHIN CAR CABIN

S6 — INSTALL THIRD SWITCH ALONG POWER LINE WITHIN TRUNK

S8 — PLACE FIRST, SECOND AND THIRD SWITCHES IN NORMALLY CLOSED POSITION

S10 — INSTALL SECOND LINE EXTENDING FROM POWER LINE, INTO TRUNK AND CONNECT TO SOLENOID OF TRUNK LOCK

S12 — CONNECT FOURTH SWITCH WITHIN TRUNK AND CONNECTED BETWEEN POWER SOURCE AND SOLENOID

S14 — PLACE FOURTH SWITCH IN NORMALLY OPEN POSITION

FIG 6A

S16 — IF PERSON IS ATTEMPTING TO REMOVE DRIVER FROM VEHICLE, FIRST SWITCH IS MANUALLY ACTIVATED, POWER IS PREVENTED FROM BEING APPLIED TO DISTRIBUTOR AND VEHICLE IS PREVENTED FROM STARTING.

S18 — IF PERSON ATTEMPTS TO STEAL VEHICLE AND PUSHES DRIVER INTO PASSENGER SEAT, SECOND SWITCH IS MANUALLY ACTIVATED, POWER IS PREVENTED FROM BEING APPLIED TO DISTRIBUTOR AND THE VEHICLE IS PREVENTED FROM STARTING

S20 — IF PERSON PUSHES OPERATOR INTO TRUNK THIRD SWITCH IS MANUALLY ACTIVATED, POWER IS PREVENTED FROM BEING APPLIED TO DISTRIBUTOR AND VEHICLE IS PREVENTED FROM STARTING

S22 — FOURTH SWITCH IS ACTIVATED BY OPERATOR PUT IN TRUNK ONCE PERSON TAKING VEHICLE LEAVES TO APPLY POWER TO SOLENOID CAUSING SOLENOID TO TURN AND TRUNK TO OPEN.

S24 — REACTIVATE SWITCH WHICH WAS ACTIVATED TO REESTABLISH CIRCUIT AND PROVIDE ABILITY TO START VEHICLE ENGINE.

FIG 6B

VEHICLE SECURITY SYSTEM

BACKGROUND OF THE INVENTION

1. Field of the Invention

The present invention relates generally to vehicle security systems and, more specifically, to a system for disconnecting the ignition of a vehicle from the vehicle battery to prevent starting of the vehicle.

2. Description of the Prior Art

Numerous vehicle security systems have been provided in the prior art. For example, U.S. Pat. Nos. 4,071,007; 4,073,279; 5,079,436; 5,144,300; 5,209,196; 5,222,468 and 5,360,997 all are illustrative of such prior art. While these units may be suitable for the particular purpose to which they address, they would not be as suitable for the purposes of the present invention as heretofore described.

An anti-theft device for a motor vehicle includes a starter-connected ignition switch which has a first accessible terminal, and a second substantially non-accessible terminal connected to a third substantially non-accessible terminal of a voltage dropping means, such as a resistor. A relay has a coil and at least a pair of contacts closable by operating the ignition switch, and is connected in series with a circuit breaker, the voltage dropping means, the ignition switch and a voltage source. The circuit breaker trips at a predetermined current setting, and the coil is designed to burn out at a current just exceeding the predetermined current. Periodically openable contact-means actuate the motor vehicle's engine and are energizable by the pair of contacts. The circuit breaker trips upon a thief shorting the accessible terminals, and the relay coil burns out upon the thief shorting the circuit breaker.

A short-out device for use with an internal combustion engine having an electric ignition comprises a switch having first and second states, connected to the engine ignition in such a way that the ignition current is not inhibited when the switch is in its second state. The device further has means for changing the switch from its first state to its second state and means for automatically maintaining the switch in its second state for a predetermined interval of time sufficient to allow the engine to die.

An anti-theft device for vehicles comprising a control circuit between the positive pole of the vehicle battery and the battery terminal of the solenoid of the starter. The control circuit comprises an SCR whose anode is connected to the positive pole and its cathode connected to the battery terminal of the solenoid. The control circuit is normally open and when closed by a detachable circuit key permits the battery positive pole to be now connected to the battery terminal.

An improved warning system for a marine propulsion unit that includes a starter, a starter switch, an ignition circuit having a kill switch for disabling the ignition circuit, a warning device and an abnormal operating condition sensor. The warning device is in circuit with the abnormal engine condition sensor and the device for sensing an attempt to start the engine with the kill switch enabled so that the single warning device will indicate either of the conditions.

An ignition apparatus for an engine includes an ignition switch and a monitor switch connected to a battery. A power supply circuit generates a reset signal for a microcomputer in response to closing of the ignition switch. A monitor signal generating circuit generates a monitor signal for the microcomputer in response to closing of the monitor switch. The microcomputer enables ignition to take place only if the monitor signal has a prescribed value when the reset signal is generated. The timing of the reset signal and the timing of the monitor signal are chosen so that the microcomputer will enable ignition only if the ignition switch and the monitor switch are closed substantially simultaneously and will prevent ignition when the switches are closed sequentially, such as when the switches are hot-wired.

The invention relates to an operating mode position selector arrangement for an internal combustion engine in a portable hand held tool such as a motor-driven chain saw. The engine includes an electrical ignition system and is supplied with a fuel mixture by a carburetor. In a start position of the operating-mode position selector, the position selector holds the choke flap and the throttle flap of the carburetor in pre-given start positions. In an operating position of the operating-mode position selector, the throttle flap is released for actuation via a throttle lever and the choke flap is fully opened. In a stop position of the operating-mode position selector, an electric contact is closed between a terminal of the electric ignition system and ground. The different positions of the operating-mode position selector are detected electrically. This is achieved in that for the operating position of the operating-mode position selector, the terminal of the electric ignition system is connected to ground via a further electric contact and a resistor. In this way, the operating position of the operating mode position selector can be distinguished from the stop position and the start position because of the different voltages which adjust in each position.

A new and improved automobile anti-theft switch is installed in series with ignition circuitry for the automobile. The apparatus includes a relay assembly which includes a relay-controlled switch. The relay-controlled switch is in series with the ignition circuitry for the automobile. A relay driver assembly is connected to the relay assembly and controls the relay-controlled switch. A timer assembly is connected to the relay driver assembly and controls operation of the relay driver assembly and the relay assembly. A disguised first switch assembly is connected to the timer assembly. When the disguised first switch assembly is moved to the open state, it permits discharge of the timer assembly. The disguised first switch assembly is covered by an object in the automobile so that the disguised first switch assembly is not visible to a person sitting behind a steering wheel for driving the automobile. The automobile can run as long as the disguised first switch assembly is in a closed state and as long as the disguised first switch assembly is in an open state and the timer assembly is running. When a thief hijacks the automobile, the thief can leave the legitimate driver behind and drive away. Then, after the timer discharges, the automobile comes to a stop.

SUMMARY OF THE PRESENT INVENTION

The present invention relates generally to vehicle security systems and, more specifically, to a system for disconnecting the ignition of a vehicle from the vehicle battery to prevent starting of the vehicle.

A primary object of the present invention is to provide a vehicle security system that will overcome the shortcomings of prior art devices.

Another object of the present invention is to provide a vehicle security system which is able to prevent a vehicle from starting upon activation of a cut off switch strategically positioned within the vehicle.

An additional object of the present invention is to provide a vehicle security system including a cut off switch located in the trunk of the vehicle allowing a victim thrown in the trunk to prevent the vehicle from starting.

A further object of the present invention is to provide a vehicle security system including a trunk latch positioned within the trunk allowing a victim thrown therein to open the trunk.

A yet further object of the present invention is to provide a vehicle security system including a cut off switch located on the passenger side of the vehicle allowing a victim in the passenger seat to prevent the vehicle from starting.

Another object of the present invention is to provide a vehicle security system that is simple and easy to use.

A still further object of the present invention is to provide a vehicle security system that is economical in cost to manufacture.

Additional objects of the present invention will appear as the description proceeds.

A vehicle security system attached to a power source for controlling a vehicle ignition is described by the present invention. The vehicle security system includes first and second normally closed switches connected in series along a first power line between the power supply and a distributor of the vehicle. The first switch is positioned within a cabin of the vehicle and the second switch is positioned with a trunk of the vehicle. A third normally open switch is connected along a second power line between the power supply and a trunk lock of the vehicle and positioned within the trunk of the vehicle. The first and second switches are operable between a first closed position connecting the power source to the distributor allowing the vehicle to be started and a second open position disconnecting the power source from the distributor and preventing the vehicle from starting. The third switch is operable between a first open position disconnecting the power source from the trunk lock and a second closed position connecting the power source to the trunk lock causing the trunk lock to turn and thus open the trunk.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims. dr

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 6 is a flow chart illustrating the operating process of the vehicle security system of the present invention.

DESCRIPTION OF THE REFERENCED NUMERALS

Figure 1:
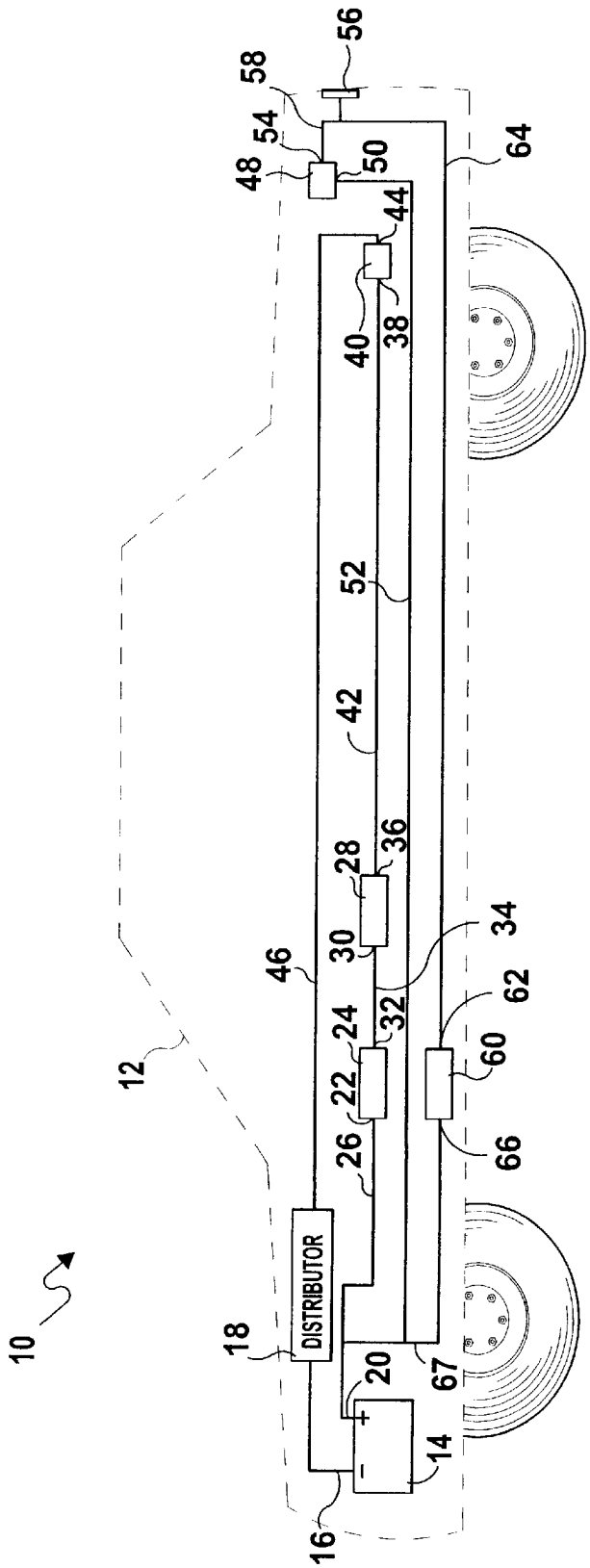
FIG. 1 is a perspective view of the vehicle security system of the present invention installed within a vehicle shown in dashed lines.

Turning now descriptively to the drawings, in which similar reference characters denote similar elements throughout the several views, the Figures illustrate the vehicle security system of the present invention. With regard to the reference numerals used, the following numbering is used throughout the various drawing figures.

| | |
|---|---|
| 10 | vehicle security system of the present invention |
| 12 | vehicle implementing the window tint master of the present invention |
| 14 | vehicle power source |
| 16 | negative terminal of power source |
| 18 | vehicle distributor |
| 20 | positive terminal of power source |
| 22 | first terminal of first switch |
| 24 | first switch |
| 26 | connection line between power source and first switch |
| 28 | second switch |
| 30 | first terminal of second switch |
| 32 | second terminal of first switch |
| 34 | connection line between first and second switch |
| 36 | second terminal of second switch |
| 38 | first terminal of third switch |
| 40 | third switch steering wheel of vehicle |
| 42 | connection line between second and third switches |
| 44 | second terminal of third switch |
| 46 | connection line between third switch and vehicle distributor |
| 48 | fourth switch clutch of vehicle |
| 50 | first terminal of fourth switch |
| 52 | connection line between vehicle power source and fourth switch |
| 54 | second terminal of fourth switch |
| 56 | trunk lock solenoid trunk of vehicle |
| 58 | connection line between fourth switch and trunk lock solenoid |
| 60 | trunk unlock latch within vehicle cabin |
| 62 | first terminal of trunk unlock latch |
| 64 | connection line between trunk unlock latch and trunk lock solenoid |
| 66 | second terminal of trunk unlock latch |
| 67 | connection line between trunk unlock latch and positive terminal of power source |
| 68 | vehicle cabin |
| 70 | steering wheel |
| 72 | driver's seat of vehicle |
| 74 | accelerator pedal of vehicle |
| 76 | brake pedal of vehicle |
| 78 | clutch pedal of vehicle |
| 80 | stick shift of vehicle |
| 82 | windshield wiper control of vehicle |
| 84 | light control of vehicle |
| 86 | trunk |
| 88 | trunk cover of vehicle |

DETAILED DESCRIPTION OF THE PREFERRED EMBODIMENT

Turning now descriptively to the drawings, in which similar reference characters denote similar elements throughout the several views, FIGS. 1 through 5 illustrate the vehicle security system indicated generally by the numeral 10.

The vehicle security system 10 is installed within a vehicle 12 depicted in dashed lines as illustrated in FIG. 1. The vehicle 12 shown in the presently explained example is an automobile however it is to be realized that the use of the vehicle security system 10 of the present invention is not limited to automobiles. The vehicle security system 10 may also be used in any type of vehicle including and not limited to a van, truck, tractor trailer, jeep, recreational vehicle, etc.

The vehicle security system 10 is connected to a power source 14 such as the car battery. The power source 14 may also be an auxiliary power source within the vehicle 12 but must be the source of power for driving the vehicle 12. The negative terminal 16 of the power source 14 is connected to the distributor 18 of the vehicle 12 while the positive terminal 20 of the power source 14 is connected to a first terminal 22 of a first switch 24 via a connection line 26. The first switch 24 is located within a passenger cabin 68 of the vehicle 12 and positioned to be readily accessible to a driver of the vehicle 12 as can be clearly seen in FIG. 2. A second switch 28 may also be located within the passenger cabin 68 of the vehicle 12 and is connected at a first terminal 30 to a second terminal 32 of the first switch 24 via a connection line 34. A second terminal 36 of the second switch 28 is connected to a first terminal 38 of a third switch 40 via a connection line 42. The third switch 40 is located within the trunk 86 of the vehicle 12 as is clearly illustrated in FIG. 3. A second terminal 44 of the third switch 40 is connected via a connection line 46 to the distributor 18 of the vehicle 12. Each of the first, second and third switches 24, 28 and 40 are biased in the normally closed position and therefore the distributor 18 is normally connected between the positive terminal 20 and negative terminal 16 of the power source 14 until at least one of the switches 24, 28 or 40 are activated to move into its open position. The use of three switches positioned in different locations within the vehicle 12 is for purposes of example only. In actual use any number of switches may be connected between the positive terminal 20 of the power source 14 and the distributor 18 thus providing additional points of activation for preventing a vehicle from starting and preventing numerous instances of vehicle theft such as if the owner was held in the back seat of the vehicle or the flat bed portion of a pickup truck.

Also connected to the positive terminal 20 of the power source 14 is a fourth switch 48. The fourth switch 48 is connected to the power source 14 at its first terminal 50 via the connection line labeled with the numeral 52 and positioned in an easily accessible position within the trunk 86. A second terminal 54 of the fourth switch 48 is connected to the solenoid of the trunk latch 56 via a connection line 58. A vehicle trunk latch 60 is located in the cabin 68 of the vehicle 12 and connected in parallel with the fourth switch 48. The vehicle trunk latch 60 is connected at a first terminal 62 thereof to the solenoid of the trunk latch 56 via a connection line 64. A second terminal 66 of the vehicle trunk latch 56 is connected to the positive terminal 20 of the vehicle power source 14.

Figure 2:
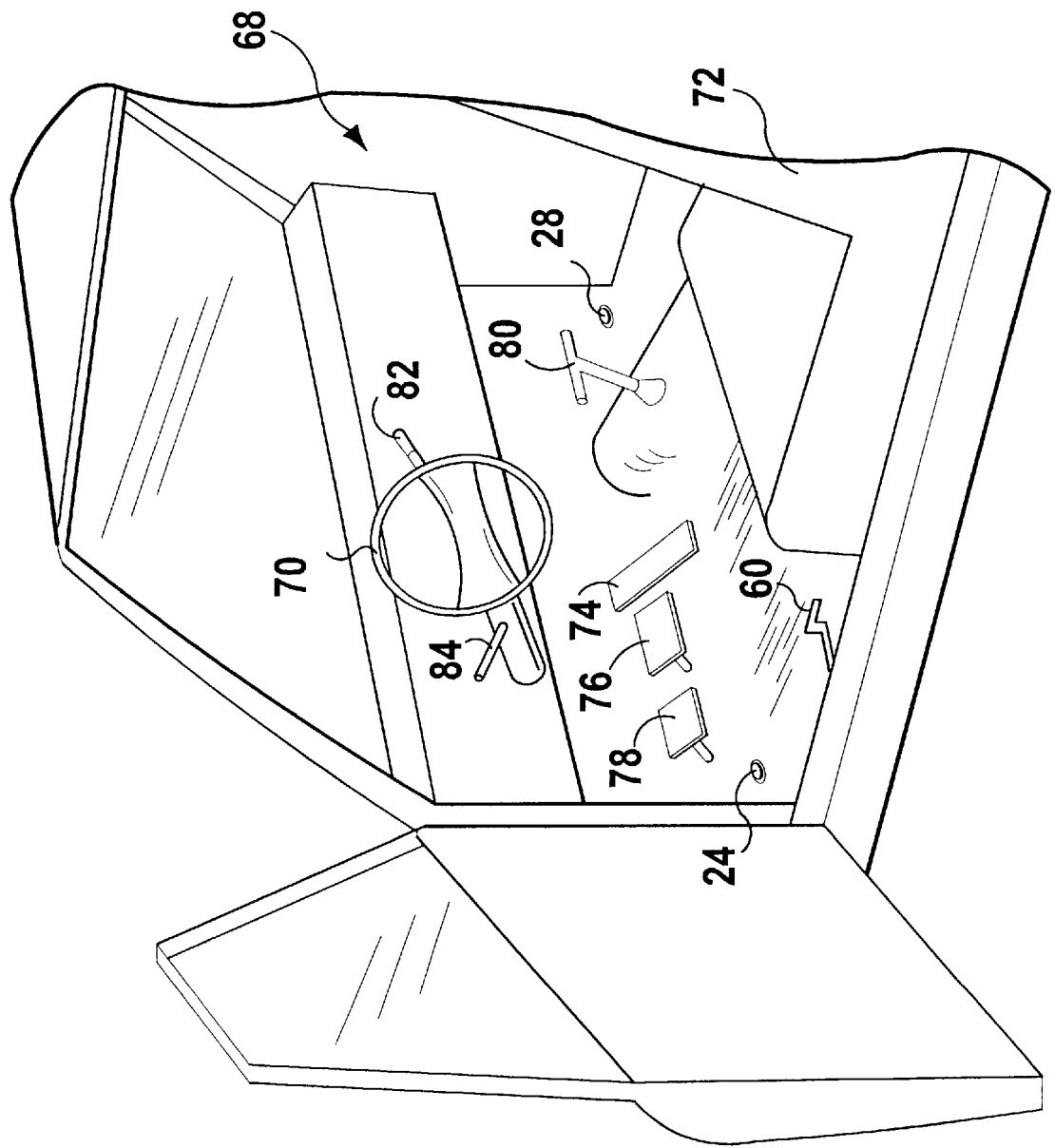
FIG. 2 is an elevated perspective view of a vehicle passenger cabin incorporating the vehicle security system of the present invention.

FIG. 2 shows a perspective view within the cabin 68 of the vehicle 12. The cabin of the vehicle is as in any conventional vehicle 12. There is a steering wheel 70 and a seat 72 for both the driver and passenger. On the floor of the cabin are located an accelerator pedal 74, a brake pedal 76, and a clutch pedal 78 along with a gear shift 80. On the steering column are located a windshield wiper control 82 and a vehicle light control 84. On the floor of the cabin 68 near the driver's side seat 72 is the trunk latch 60 for opening the trunk from inside the vehicle 12. Also visible on the floor of the vehicle cabin 68 are the first and second switches 24 and 28. These switches 24 and 28 are strategically positioned to be easily activated from either the driver or passenger side of the vehicle 12. Normally the switches 24 and 28 can be covered or camouflaged and thus not easily visible to persons unaware of their presence. They may also be easily activated by simply pressing on the switch to apply pressure with a foot.

Figure 3:
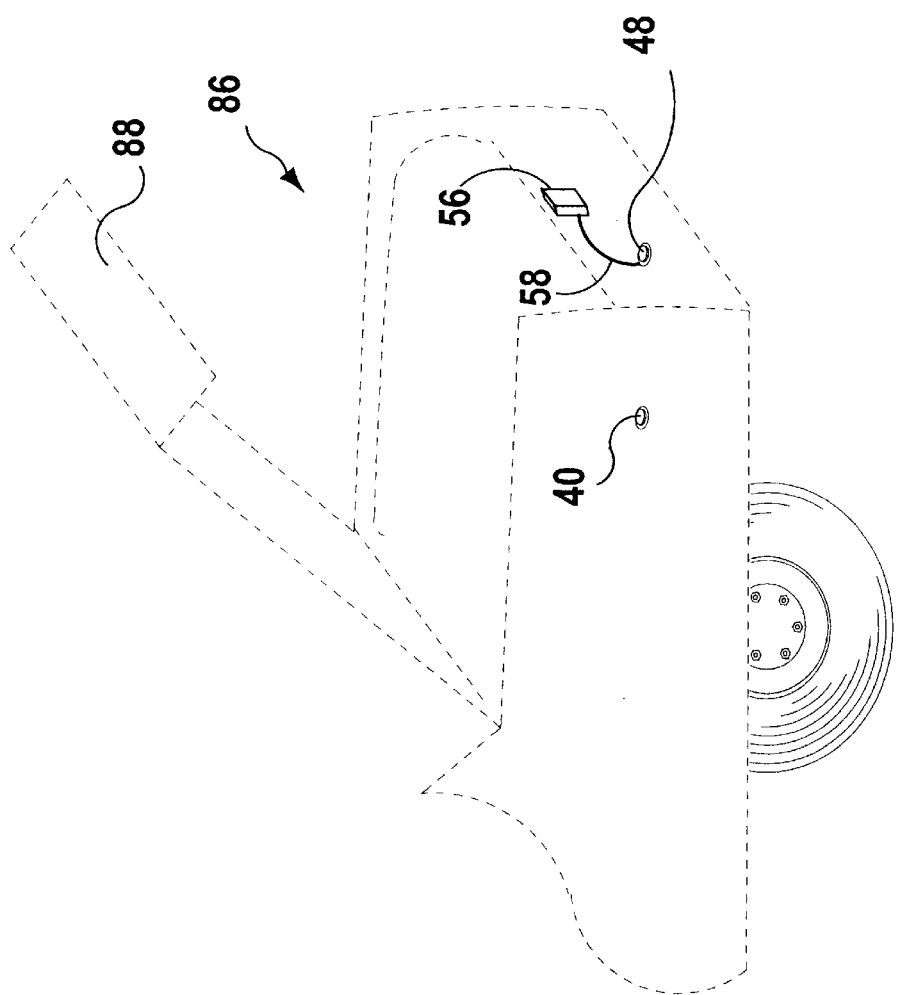
FIG. 3 is an elevated perspective view of a trunk incorporating the vehicle security system of the present invention.

The third switch 40 and fourth switch 48 are illustrated in FIG. 3. These switches are located in the trunk 86 of the vehicle 12. The third and fourth switches 40 and 48 are positioned in the trunk 86 for the main purpose of aiding a person/victim who has been thrown in the trunk 86 and the trunk cover 88 has been closed locking them in. The third switch 40 is in the normally closed position and is connected between the second switch 28 and the distributor 18 as described hereinbefore. When the third switch 40 is activated by a person within the trunk 86 it will open thereby cutting off the supply of power to the distributor 18 by breaking the connection between the distributor 18 and the power source 14. This will cause the engine to either turn off or prevent the engine from starting. Once the vehicle 12 is stopped, the person within the trunk 86 may now activate the fourth switch 48. This switch 48 is in the normally open position. Activation of this switch 48 will cause it to close and thus apply power to the solenoid of the trunk lock 56. The application of power to the solenoid of the trunk lock 56 causes it to turn, releasing the trunk cover 88 from its locked position and opening the trunk 86. The person locked in the trunk 86 is now free to exit.

Figure 4:
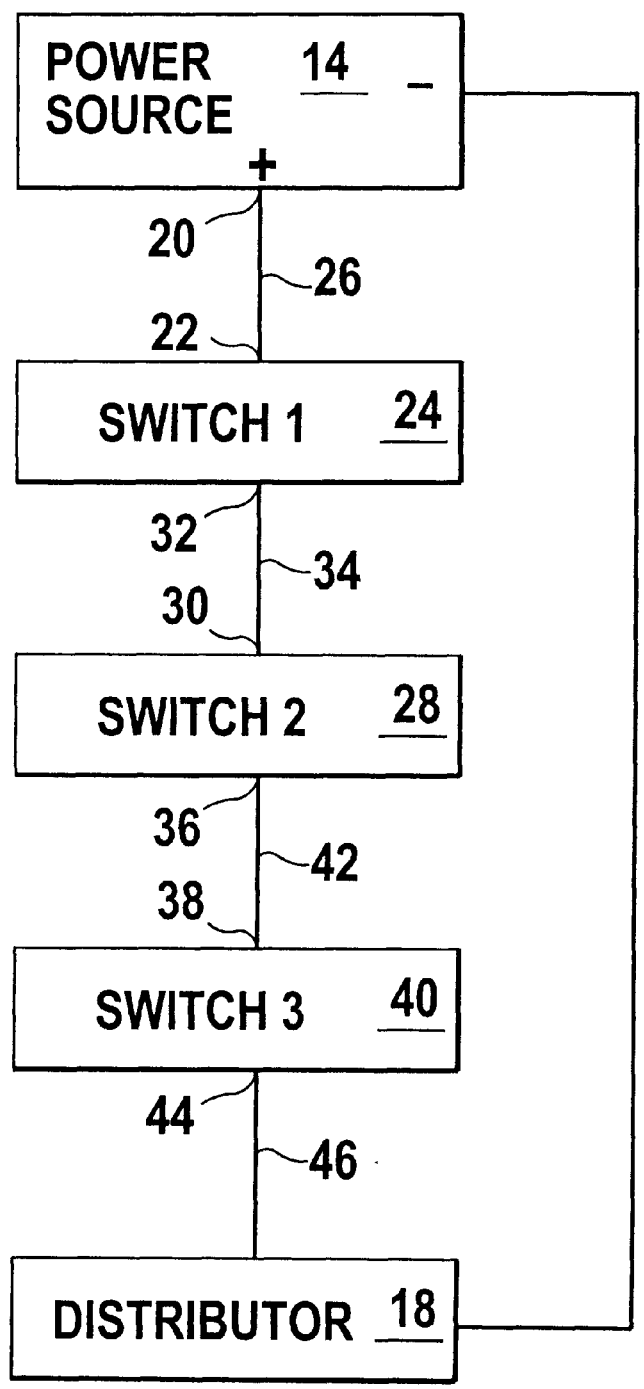
FIG. 4 is a schematic diagram of the ignition cut off circuitry of the vehicle security system of the present invention.

FIG. 4 is a schematic diagram illustrating the ignition cut off portion of the system 10. As can be clearly seen from this figure, the negative terminal 16 of the power source 14 is connected to the distributor 18 of the vehicle 12 while the positive terminal 20 of the power source 14 is connected to the first terminal 22 of the first switch 24 via connection line 26. The second switch 28 is connected at its first terminal 30 to the second terminal 32 of the first switch 24 via connection line 34. The third switch 40 is connected between the second switch 28 and the distributor 18 to complete the circuit between the power source 14 and the distributor 18. The first terminal 38 of the third switch 40 is connected via connection line 42 to the second terminal 36 of the second switch 28. The second terminal 44 of the third switch 40 is connected via connection line 46 to the distributor 18 of the vehicle 12. Each of the first, second and third switches 24, 28 and 40 are biased in the normally closed position and therefore the distributor 18 is directly connected to the power source 14 until at least one of the switches 24, 28 or 40 are activated to move into its open position.

Figure 5:
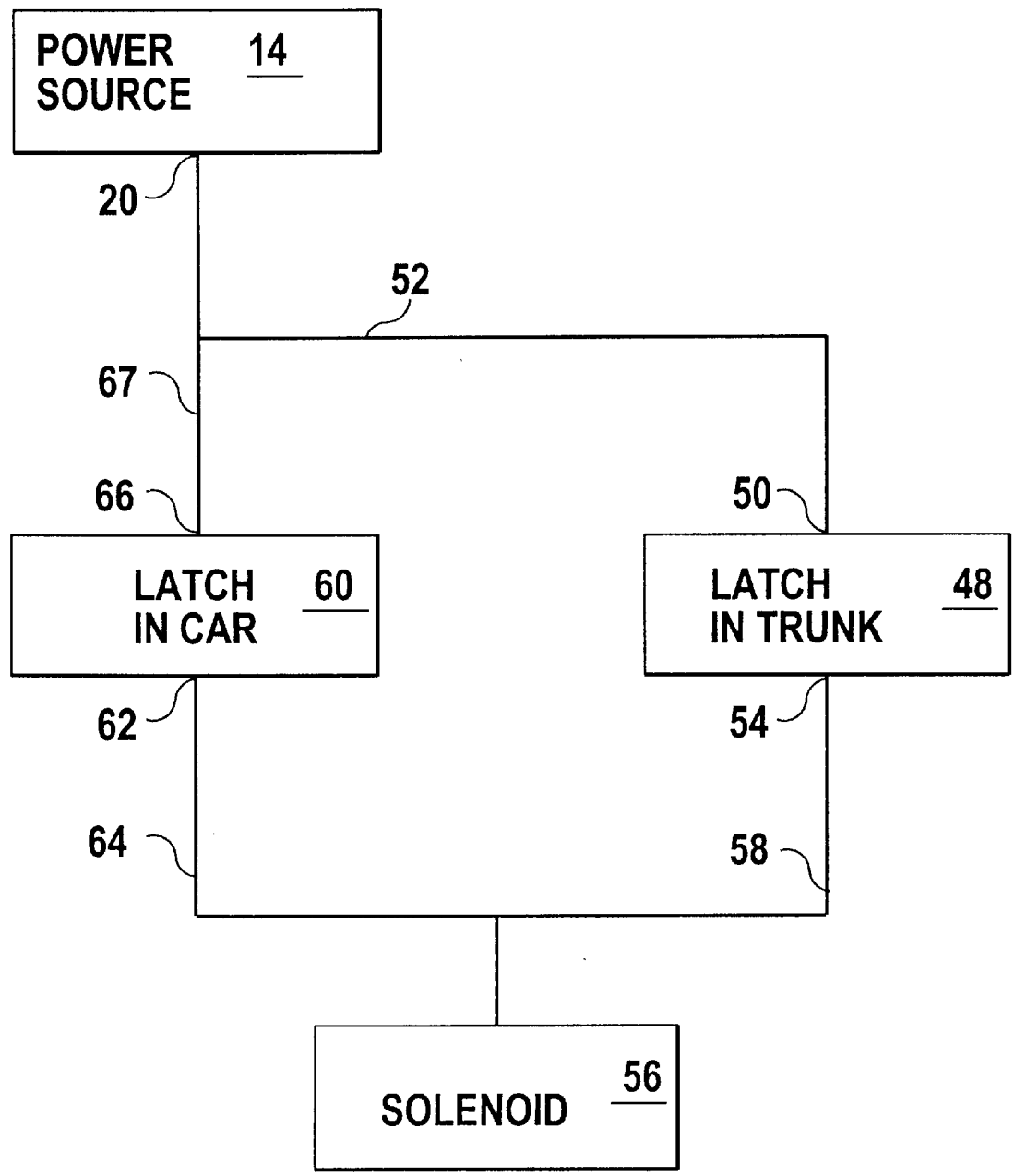
FIG. 5 is a schematic diagram of the trunk unlock feature of the vehicle security system of the present invention.

A schematic diagram illustrating the ignition cut off portion of the system is shown in FIG. 5. As can be clearly seen from this figure, the positive terminal 20 of the power source 14 is connected to the first terminal 50 of the fourth switch 48 via connection line 52. The second terminal 54 of the fourth switch 48 is connected to the solenoid of the trunk latch 56 via connection line 58. The vehicle trunk latch 60 is located in the cabin 68 of the vehicle 12 and is connected in parallel with the fourth switch 48 between the positive terminal 20 of the power source 14 and the solenoid of the trunk lock 56. The vehicle trunk latch 60 is connected at its first terminal 62 to the solenoid of the trunk latch 56 via connection line 64 while the second terminal 66 of the vehicle trunk latch 56 is connected to the positive terminal 20 of the vehicle power source 14 via connection line 67.

The operation of the vehicle security system 10 will now be described with reference to the figures and specifically FIG. 6. In operation, the vehicle security system 10 is installed in the vehicle 12. A first power line is installed within the vehicle 12 connected to the positive terminal of the power source 14 or vehicle battery and extending through the vehicle cabin 68, into and through the trunk 86 and back along a length of the vehicle 12 to connect with the distributor as described in step S2. The first switch 24 is connected to the first power line and positioned on a floor of the vehicle cabin 68 so as to be easily accessible to a person within the driver's seat and the second switch 28 is connected to the first power line and positioned on a floor of the vehicle cabin so as to be easily accessible to a person within the passenger's seat of the vehicle as stated in step S4. The first and second switches 24 and 28 should be covered so as not to be readily visible or known to persons other than the owner or user of the vehicle 12. The third switch 40 is connected to the first power line and positioned within the trunk 86 of the vehicle 12 so that a person placed in the trunk 86 can easily activate the switch 40 as described in step S6. The first, second and third switches 24, 28 and 40 should be in the normally closed position and thus provide a direct connection between the power source 14 and the distributor 18 when not activated as described in step S8. The order in which the switches are connected along the first power line does not affect the operation of the system 10. The switches can be connected in any order desired, the order described is for purposes of example only and not meant to be limiting on the invention.

A second power line is installed within the vehicle 12 connected to the positive terminal of the power source 14 or vehicle battery and extending through the vehicle cabin 68 and into the trunk 86 to connect with the solenoid of the trunk lock 56 as described in step S10. The fourth switch 48 is connected between the second power line and the solenoid of the trunk lock 56 and positioned within the trunk 86 of the vehicle 12 so that a person placed in the trunk 86 can easily activate the switch 48 as described in step S12. The fourth switch 48 is connected in parallel connection with a trunk latch 60 contained within the cabin 68 of the vehicle 12 and operates in the same manner. The fourth switch 48 is placed in a normally open position disconnecting the solenoid of the trunk lock 56 from the power source 14 when not activated as stated in step S14. When the system 10 is fully installed, the distributor 18 is connected to the power source 14 and the vehicle 12 may be started and used when desired.

If the driver of the vehicle 12 is being forced out of the vehicle 12 by a person attempting to steal the vehicle 12, the first switch 24 is activated by the driver by applying a force thereto such as by stepping on the first switch 24. This will activate the first switch 24 causing it to open and thus disconnecting the distributor 18 from the power source 14. The vehicle 12 is now prevented from starting as described in step S16.

If the driver of the vehicle 12 is being forced into passengers seat by a person attempting to steal the vehicle 12, the second switch 28 is activated by the driver by applying a force thereto such as by stepping on the second switch 28. This will activate the second switch 28 causing it to open and thus disconnecting the distributor 18 from the power source 14. The vehicle 12 is now prevented from starting as stated in step S18.

If the driver of the vehicle 12 is being forced into the trunk 86 by a person attempting to steal the vehicle 12, the third switch 40 located in the trunk 86 is activated by the driver by applying a force thereto such as by pressing it with ones hand or foot This will activate the third switch 40 causing it to open and thus disconnecting the distributor 18 from the power source 14. The vehicle 12 is now prevented from starting as described in step S20.

The fourth switch 54 is activated by the driver after activating the third switch 40 causing the vehicle 12 to come to a stop and prevented from starting by applying a force thereto. This will activate the fourth switch 54 causing it to close and thus connecting the solenoid of the trunk lock 56 to the power source 14. The solenoid of the trunk lock 56 will be caused to turn by the application of power thereto and the trunk cover 88 will open thus releasing the driver from within the trunk 86 as stated in step S20. Once the thieves flee the vehicle 12 the activated one of the first, second and third switches 24, 28 and 40 may now be re-activated to close and connect the distributor 18 to the power source 14. The vehicle may now be started as described in step S24.

From the above description it can be seen that the vehicle security system of the present invention is able to overcome the shortcomings of prior art devices by providing a vehicle security system which is able to prevent a vehicle from starting upon activation of a cut off switch strategically positioned within the vehicle. The vehicle security system includes a cut off switch located in the trunk of the vehicle allowing a victim thrown in the trunk to prevent the vehicle from starting and a trunk latch positioned within the trunk allowing a victim thrown therein to open the trunk. The vehicle security system also includes a cut off switch located on the passenger side of the vehicle allowing a victim in the passenger seat to prevent the vehicle from starting. Furthermore, the vehicle security system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A vehicle security system attached to a power source for controlling a vehicle ignition, said vehicle security system comprising:
   a) a first power line connected between the vehicle battery and a distributor of the vehicle;
   b) first, second, and third normally closed switches connected along said first power line in series connection between the power supply and a distributor of the vehicle, said first switch being positioned within a cabin of the vehicle accessible to the driver of said vehicle, said second switch being positioned so as to be accessible to the passenger side of the front seat of said vehicle, and said third switch being located within a trunk of the vehicle so that the opening of any one of said first, second and third switches will disable said vehicle, said first and second switches being pressure activated by a foot and hidden from view;

c) a second power line connected between the vehicle battery and a trunk lock of the vehicle;

d) a fourth normally open switch connected along said second power line between the power supply and a trunk lock of the vehicle, said fourth switch being positioned within the trunk of the vehicle, wherein said fourth switch is operable between a first open position disconnecting the power source from the trunk lock and a second closed position connecting the power source to the trunk lock causing the trunk lock to turn and thus open the trunk, the location of said fourth switch within said trunk enabling a person trapped in said trunk to open said trunk and escape; and e) a fifth normally open switch within the cabin of said vehicle in parallel with said fourth switch to permit the normal opening of said trunk by the vehicle driver.

* * * * *